United States Patent [19]

Bierman et al.

[11] Patent Number: 4,511,541
[45] Date of Patent: Apr. 16, 1985

[54] PROCESS FOR THE RECOVERY OF CADMIUM AND OTHER METALS FROM SOLUTION

[75] Inventors: Laurence W. Bierman; Samuel M. Polinsky; David A. Hempel; Roger B. Humberger, all of Pocatello, Id.

[73] Assignee: J. R. Simplot Company, Boise, Id.

[21] Appl. No.: 446,362

[22] Filed: Dec. 2, 1982

[51] Int. Cl.³ .............................................. C01G 11/00
[52] U.S. Cl. ...................................... 423/100; 423/10; 423/54; 423/55; 423/101; 423/139; 423/140; 423/321 S; 75/101 BE; 75/101 R; 75/108; 75/121; 210/711; 210/729; 210/751; 209/166
[58] Field of Search ...................... 423/10, 54, 55, 56, 423/100, 101, 139, 140, 321 R, 321 S; 75/101 R, 103, 101 BE, 108, 121; 210/751, 711, 729; 209/166

[56] References Cited

U.S. PATENT DOCUMENTS

| | | | |
|---|---|---|---|
| 3,214,239 | 10/1965 | Hazen et al. | 423/10 |
| 3,355,017 | 11/1967 | Wystrach et al. | 209/166 |
| 3,894,143 | 7/1975 | Von Semel et al. | 423/313 |
| 3,937,783 | 2/1976 | Wamser et al. | 423/8 |
| 3,969,484 | 7/1976 | Onozaki et al. | 423/58 |
| 4,053,561 | 10/1977 | Irani et al. | 423/313 |
| 4,053,562 | 10/1977 | Harnisch et al. | 423/313 |
| 4,073,860 | 2/1978 | Huggins et al. | 423/14 |
| 4,157,912 | 6/1979 | Weir et al. | 75/101 R |
| 4,207,302 | 6/1980 | Smith | 423/321 S |
| 4,225,568 | 9/1980 | Leveque | 423/321 S |
| 4,226,791 | 10/1980 | Reinhardt et al. | 423/100 |
| 4,265,861 | 5/1981 | Cleary et al. | 75/103 |
| 4,284,606 | 8/1981 | Rendell et al. | 423/6 |
| 4,292,278 | 9/1981 | Elikan et al. | 423/8 |
| 4,308,240 | 12/1981 | Harper et al. | 423/150 |
| 4,309,390 | 1/1982 | Harper et al. | 423/150 |
| 4,311,521 | 1/1982 | Harper et al. | 423/150 |
| 4,317,804 | 3/1982 | Ichijo | 423/139 |

Primary Examiner—John Doll
Assistant Examiner—Robert L. Stoll
Attorney, Agent, or Firm—Fulwider, Patton, Rieber, Lee & Utecht

[57] ABSTRACT

A process for the selective recovery of cadmium, molybdenum, zinc, nickel and other metal values from wet process phosphoric acid and other acidic to slightly basic carrier solutions, wherein the metal-bearing solution is contacted with an organophosphene extractant to precipitate the metal values for subsequent separation from the solution. Separation may be effected by mechanical means or by scrubbing with a water-immiscible organic solvent such as kerosene for subsequent recovery of the metal values. The metal specie recovered is determined by the concentration of the organophosphene, which may be selectively adjusted to recover a series of metal values in a sequence of stages.

22 Claims, 3 Drawing Figures

PROCESS FOR THE RECOVERY OF CADMIUM AND OTHER METALS FROM SOLUTION

BACKGROUND OF THE INVENTION

This invention relates generally to the recovery of cadmium and other metals from phosphoric acid and other acidic to slightly basic carrier solutions, and more particularly, to the use of an organophosphene extractant which selectively extracts the desired metal species.

Valuable minerals are often recovered from ores by partial dissolution and subsequent processing to a final product. An example of the approach is the dissolution of apatite, a complex calcium phosphate mineral, in sulphuric acid to produce "wet process" phosphoric acid. The phosphoric acid may then be purified and concentrated, and subsequently processed into phosphates suitable for use in fertilizer and industrial applications.

When the ore is dissolved in acid, metal species present in minor amounts are dissolved as impurities into the phosphoric acid, and the impurities can be recovered from the acid solution to avoid contamination of the final product or, where feasible, for their economic value. Because the concentrations of the metallic impurities are ordinarily low, their recovery from acid solution is usually accomplished in two steps, a concentration step and a final purification step. The technologies such as electrowinning and crystallization used in the final purification step are relatively well known, and the present invention is directed toward the concentration step.

In the solvent extraction process for concentrating metal values, the solution containing the metal values is contacted to an organic extractant dissolved in a water-immiscible organic solvent. The solvent containing the metal-laden extractant is then separated from the aqueous solution for subsequent recovery of the metal from the extractant as a concentrated aqueous solution.

Solvent extraction processes for concentrating metal values typically suffer from several shortcomings, including low efficiency and a lack of selectivity of the metal value extracted. The low efficiency of extraction from the aqueous solution leaves metallic impurities in the solution which may be detrimental to the final product, and also results in a reduced economic benefit for extraction of the metal values. A second significant problem is the lack of selectivity of typical extractants, so that several different metal species may be extracted at one time, necessitating a costly separation step in subsequent purification of the metal values. Additionally, in some instances it is desirable that the metal values be physically separable from the aqueous solution without the need for an immiscible organic solvent, and such a procedure is not possible with liquid-liquid extraction. Accordingly, there has been a need for an improved approach to the concentration and recovery of metal values from dilute acid and other carrier solutions. The present invention fulfills this need, and further provides related advantages.

SUMMARY OF THE INVENTION

The present invention provides a method for extracting metal values from dilute acid or other acidic to slightly basic carrier solution by contacting the solution to a selective extractant which precipitates the metal values for subsequent physical separation from the solution. Subsequent separation of the precipitated metal values may be by a wide variety of processes, including air flotation, filtration, mechanical skimming, and ion flotation, wherein the precipitated metal values are scrubbed from the aqueous solution by an organic solvent. The extractant may be adjusted to selectively extract a variety of metal values, including cadmium, molybdenum and zinc, nickel, and other metals. The capability of selective extraction allows a multi-stage separation process wherein individual metallic values may be extracted at each stage, yet wherein only a single type of extractant is used throughout the process. In an ion flotation process embodiment described herein, a further process for recovering the extractant and organic solvent is described. With this invention, metal values may be efficiently and selectively extracted from acid and other carrier solutions.

In accordance with the invention, extractants having the ability to selectively precipitate metal values from acid and other carrier solutions have been identified. After precipitation, the metal values are physically separated from the aqueous solution by known mechanical separation procedures, or by ion flotation, wherein the precipitated metal values are scrubbed with a water-immiscible organic solvent and then separated by allowing the immiscible liquids to separate. The selectivity of the extractant allows extraction of several different metal species in a multi-stage extraction from the solution using only the one type of extractant, if the concentration of several different metallic species is sufficiently high in the solution to warrant their individual extraction.

In a preferred embodiment of the invention, a family of organophosphene extractants has been identified, wherein the metal value extracted is dependent upon the relative concentration of extractant contacted to the aqueous solution in an extraction step. A low concentration of the organophosphene selectively extracts cadmium values from wet process phosphoric acid, while progressively higher concentrations of the organophosphene extract molybdenum and zinc, and then nickel values. These metal values and others may be individually recovered in a succession of stages. Further, a continuous ion flotation process has been devised wherein the extractant is scrubbed from the aqueous carrier solution by a water-immiscible organic solvent, such as kerosene, for subsequent stripping by an aqueous ammonium hydroxide, sodium hydroxide, potassium hydroxide or other basic solution. The metal values are removed from this aqueous solution by ion exchange, and the extractant is then recovered by acidification for reintroduction into the organic solvent and recycling to the extraction stage.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate embodiments of the invention. In such drawings.

DETAILED DESCRIPTION OF THE PREFERRED EMBODIMENT

Figure 1:
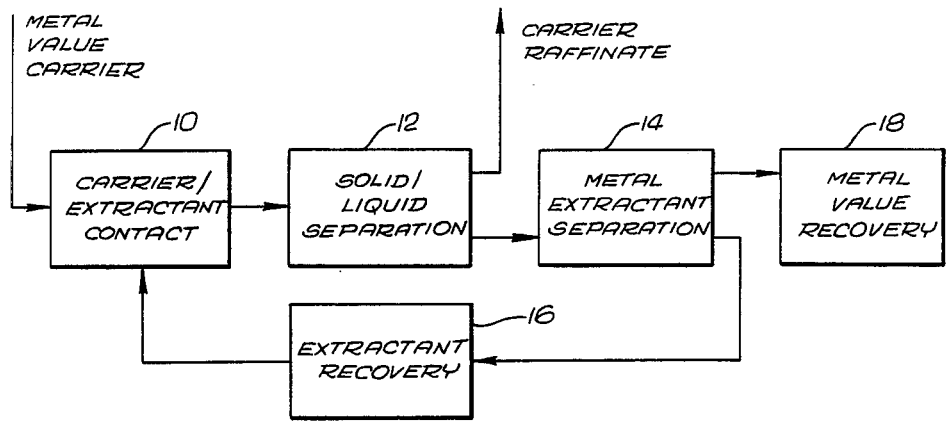
FIG. 1 is a highly schematic process flow chart for recovering metal values from a carrier solution.

As is shown in the drawings for purposes of illustration, the present invention is embodied in a process for extracting and recovering metal values from a continuous flow or batch of wet process phosphoric acid. The acid is produced by dissolving phosphorus-containing ore in sulfuric acid to produce an impure phosphoric acid having a variety of metals dissolved therein, termed a loaded carrier solution. After removal of the dissolved metallic species, the purified phosphoric acid may be sold or further processed into products such as fertilizer.

In accordance with the present invention and as shown in a highly schematic form in FIG. 1, metal values are separated from the carrier solution in a contact step 10 by contacting the carrier solution with a selective extractant to precipitate a selected metal specie in solid form from the aqueous carrier solution. The metal specie extracted is determined by its ability to chelate with the organophosphene, which in turn is determined, at least in part, by the concentration of the organophosphene. A separation 12 of the precipitated solid, which includes the selected metal values and the extractant, from the liquid phase yields a carrier raffinate, purified of the precipitated metal specie, and suitable for further extraction of other metal species or final processing. The solid-liquid separation 12 may be accomplished by conventional procedures, such as air flotation or mechanical skimming, or, preferably, by ion flotation. The extractant then undergoes a separation 14 from the metal values and, where possible, provided an extractant recovery treatment 16 for recycling to the contact step 10. The concentrated metal values are then passed to a recovery step 18 for final processing into useful metal.

Figure 2:
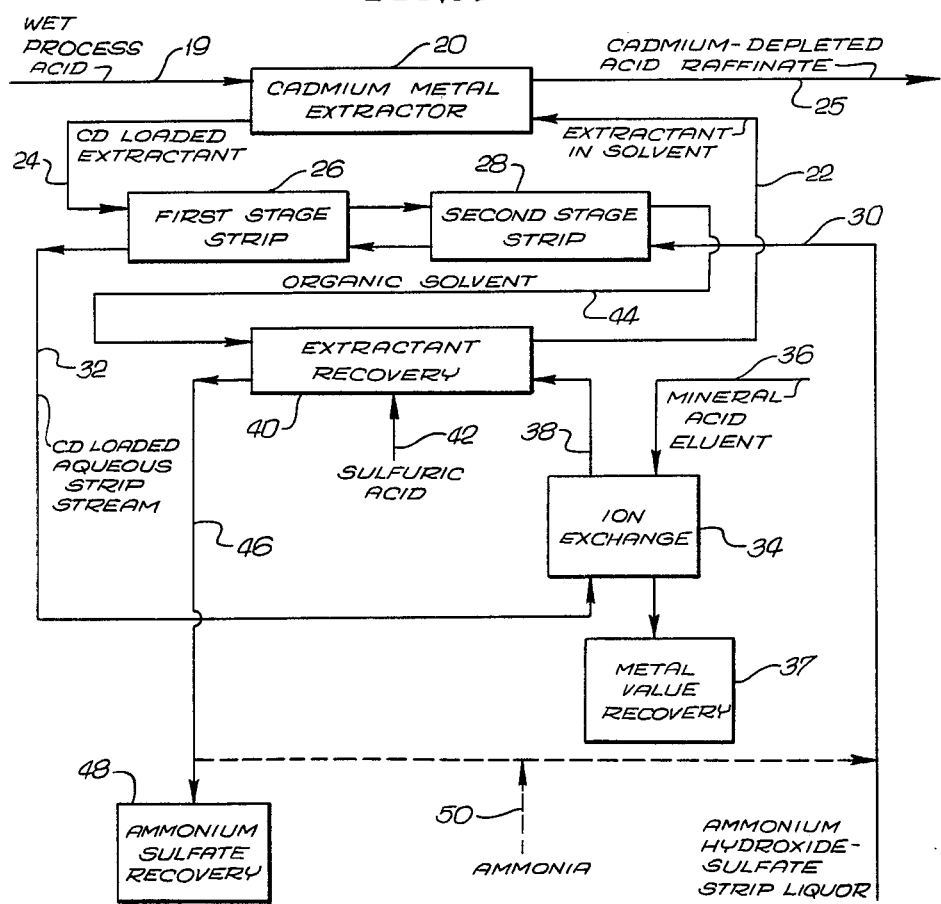
FIG. 2 is a process flow chart for recovering metal values by an ion flotation process.

More specifically, and as illustrated in FIG. 2 for the presently preferred ion flotation embodiment for recovering cadmium from an aqueous wet process phosphoric acid stream 19, the acid containing the cadmium metal values is contacted to an organophosphene extractant in a metal extractor 20 to precipitate the cadmium metal as a solid compound with the organophosphene. The metal-containing precipitate is separated from the aqueous acid solution by scrubbing with a water-immiscible organic solvent such as kerosene, and allowing phase separation of the organic and aqueous phases to occur. In its hydrogen form, the organophosphene extractant is preferentially dissolved into solution in the organic solvent, so that the organophosphene solute and organic solvent may be introduced together as stream 22 into the metal extractor 20. When the organophosphene extractant is thus introduced as a solute in the kerosene solvent, the precipitation of the cadmium metal values in the metal extractor 20 results in a fine suspension of particles in the organic solvent. After the phase separation of the solvent from the aqueous phase, the cadmium value is readily conducted away with the organic phase in the cadmium-loaded extractant stream 24, and the cadmium depleted acid raffinate 25 is conducted away for further processing.

The cadmium value and the organophosphene extractant are separated from the organic solvent by stripping with a basic aqueous ammonium hydroxide solution, in a first stage strip 26 and a second stage strip 28. Stripping occurs by preferential dissolution of the loaded extractant into the basic aqueous solution, from the organic solution. A fresh strip liquor stream 30 comprising an aqueous ammonium hydroxide solution is introduced into the second stage strip 28. In addition to the ammonium hydroxide, the strip liquor may include an anion such as a sulfate in the form of ammonium sulfate, to maintain the suspension of the cadmium value carried by the organophosphene.

Following the stripping steps 26 and 28, a cadmium-loaded aqueous strip stream 32 of the cadmium value, sulfate and organophosphene extractant in the basic ammonium hydroxide aqueous solution is conducted to a conventional ion exchange column 34 for separation of the cadmium value. Passage of the stream 32 through the ion exchange column 34 loads the cadmium into the exchange resin contained in the column 34 to further concentrate the cadmium value, and the cadmium value is later eluted from the resin with a mineral acid such as sulfuric acid, by passage of eluent stream 36. A metal value recovery 37 from the concentrated cadmium-loaded eluent is accomplished by conventional means such as electrowinning or crystallization.

A cadmium-depleted strip solution 38 of organophosphene extractant and sulfate in aqueous ammonium hydroxide solution passes from the ion exchange column 34 to an extractant recovery unit 40 to recover the organophosphene extractant for subsequent recycling and reuse in the metal extractor 20. Sulfuric acid 42 is added to the aqueous solution in the extractant recovery unit 40 to acidify the aqueous solution so that the organophosphene extractant in its hydrogen form will preferentially transfer from the aqueous solution to the organic solvent. The organic solvent stream 44 is conducted from the second strip stage 28 to the extractant recovery unit 40 and contacted to the acidified aqueous solution containing the organophosphene extractant, so that the organophosphene extractant dissolves into the organic solvent. The resulting solution of organophosphene extractant and solvent is conducted in stream 22 to the metal extractor 20 to repeat the extraction operations. The acidic aqueous solution 46 containing the sulfate anion is conducted away to an ammonium sulfate recovery 48 for recovery and processing of the sulfate. A portion of the sulfate from stream 46 may be added into stream 30 for introduction into the ammonium hydroxide strip liquor, as a source of sulfate. With such recycling of the sulfate anions, an ammonia supply 50 may be provided to introduce an excess of ammonium ions in the strip liquor stream 30.

A variety of different metal value carrier solutions may be treated with the process of the present invention, in addition to the described wet process phosphoric acid, as long as the pH of the carrier solution is below about 10. For a wet process phosphoric acid solution, the concentration of the acid may be as low as about 1% $P_2O_5$, or as high as about 52% $P_2O_5$, with 30% $P_2O_5$ being preferred. In a typical wet process phosphoric acid solution, the cadmium concentration is generally between about 5 and 100 parts per million. After passage through the metal extractor 20, the raffinate 25 typically contains about 0.5 to 1.5 parts per million, with the extraction efficiency of cadmium value being about 96–98%.

The preferred extractant in the above-described process is an organophosphene sulfide, most preferably diisobutyl dithiophosphene, but other organophosphenes such as tri-n-propylphosphene sulfide, tri-n-octylphosphene sulfide, dicyclohexyl phosphene sulfide, di i-butylphosphene sulfide and dicyclohexyldithiophosphinate are also suitable. In the most general form of the process, the extractant is used without any solvent, but in ion flotation the extractant is dissolved in any organic solvent whose boiling point is above the temperature of the process. Extractions have been performed at room temperature and at temperatures as high as about 160° F. without significant changes in the results. Kerosene is the preferred solvent but other organic solvents including decane, dodecane, toluene, p-xylene and ethylbenzene may be used.

In the preferred embodiment, the aqueous strip liquor 30 is made basic by the addition of ammonium hydroxide, and also may include an anion to maintain the solubility of the metal values carried by the organophosphene extractant. Other bases such as sodium or potassium hydroxide may be substituted for the ammonium hydroxide. The anion may be supplied by any alkaline earth salt capable of dissolving in the aqueous strip liquor, including, for example, sodium sulfate, potassium sulfate, ammonium sulfate, sodium chloride, potassium chloride, ammonium chloride, sodium nitrate, potassium nitrate, ammonium nitrate, calcium chloride and calcium nitrate.

Any suitable cation resin in its salt form can be used to concentrate the metal value in the ion exchange column 34. A suitable resin for cadmium is Dowex 50. After loading of the column with the metal value, elution is accomplished with any mineral acid recommended for the resin chosen, with aqueous sulfuric acid being the preferred eluent 36 for Dowex 50.

A mineral acid 42 is added to the depleted strip solution 38 in the extractant recovery unit 40 to acidify the flow, thereby causing the extractant to preferentially dissolve into the organic solvent. Sulfuric acid is the preferred mineral acid, but other mineral acids such as phosphoric, hydrochloric or nitric acid may also be used.

As noted previously, the extractant may be adjusted to selectively extract particular metal species from the carrier solution. For the preferred ion flotation process, the metal specie extracted depends upon the concentration of the extractant in the solvent in stream 22, and the relative volumetric flow rates of the extractant and solvent stream 22 and the acid stream 19. Although the numerical values may be dependent upon the extractant, solvent and carrier materials used, in a typical case of a 0.02 molar diisobutyl dithiophosphene extractant dissolved in kerosene (stream 22) and a 30% $P_2O_5$ wet process phosphoric acid (stream 19), the organic-to-aqueous volumetric flow ratio for cadmium extraction is preferably about 1/5 for an acid containing about 50 parts per million cadmium. For other normalities of solvent and other concentrations of cadmium, organic-to-aqueous ratios as low as about 1/200 could be used. A one-minute mixing retention or contact time in the metal extractor 20 is adequate to substantially deplete the wet process phosphoric acid stream 19 of cadmium. Under these process conditions, the volumetric flow rates of the loaded organic extractant stream 24 to the aqueous strip liquor stream 30 is typically from about 1/1 to about 5/1. Preferably, two stages of stripping and a 2/1 organic-to-aqueous flow rate are employed, with a mixing retention time in each stage of from about 30 seconds to about five minutes, preferably about two minutes.

Figure 3:
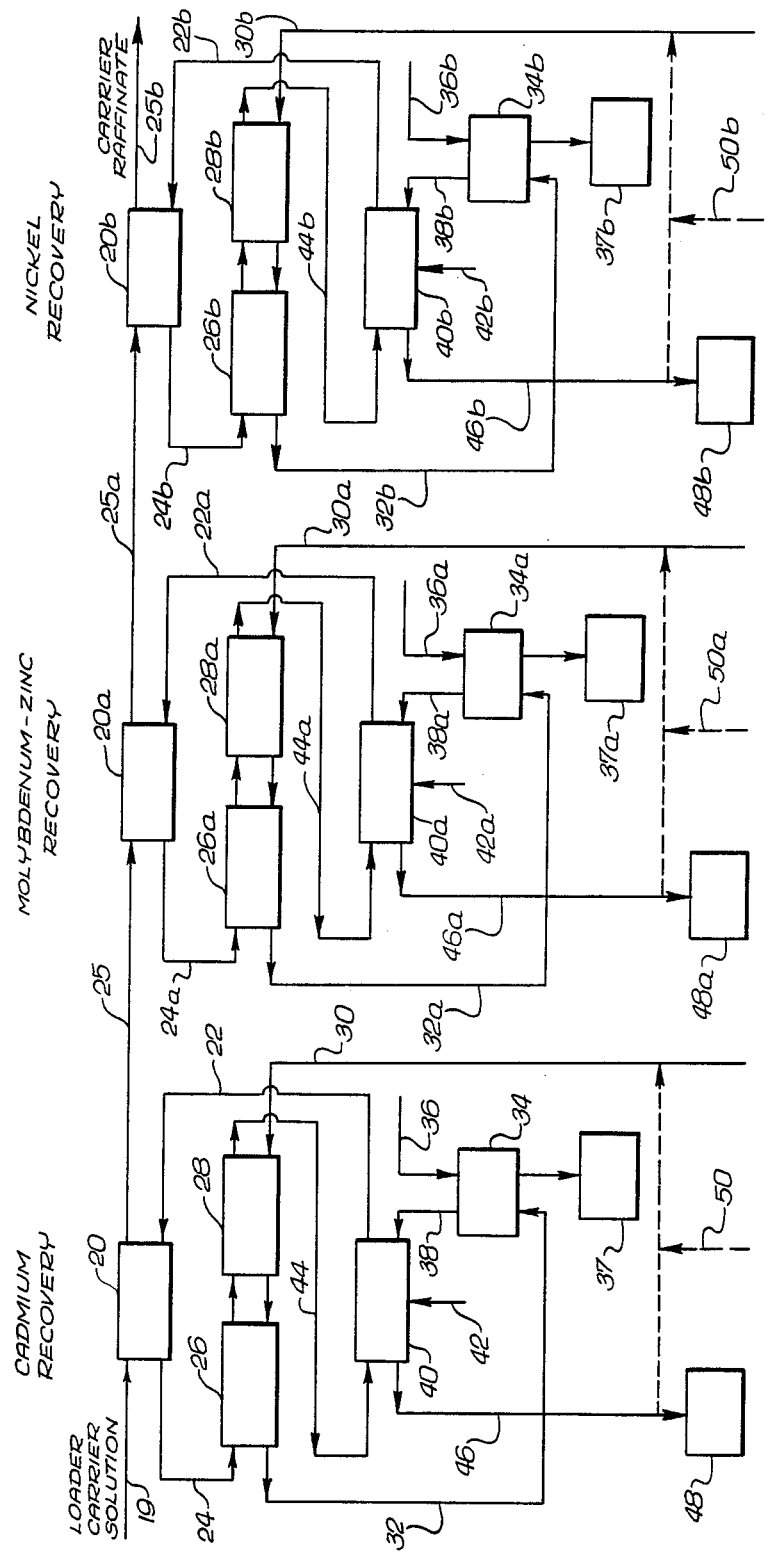
FIG. 3 is a process flow chart for successively recovering several metallic species from a carrier solution by a multi-stage ion flotation process.

As illustrated in FIG. 3, after the acid stream 19 has been depleted of cadmium in a first extractor 20, the raffinate 25 may be passed to metal extractors 20a and 20b in subsequent stages for the selective extraction of additional metal species, including molybdenum and zinc, and nickel. The second and third stages of recovery for molybdenum-zinc and nickel, respectively, generally utilize similar process steps to those described previously in relation to the cadmium-recovery stage, illustrated in FIG. 2. (Although molybdenum and zinc are different metals, in the described preferred embodiment they are coextracted, and are therefore described as a single specie herein.) In FIG. 3 the elements of the cadmium recovery stage are repeated from FIG. 2, and the corresponding elements have been identically numbered with suffixes "a" and "b" for the molybdenum-zinc recovery and nickel recovery stages, respectively. It is therefore understood that the molybdenum-zinc recovery extractor 20a and the nickel recovery extractor 20b correspond in function to the cadmium recovery extractor 20. The other functional steps of the molybdenum-zinc recovery stage and the nickel recovery stage are qualitatively identical to those of the cadmium recovery stage, as may be seen by comparing corresponding elements between FIG. 2 and FIG. 3. The molybdenum-zinc and nickel recovery stages will therefore not be further described, it being understood that the qualitative operation of these stages is as described above for the cadmium recovery stage, depicted in FIG. 2.

However, the quantitative values of concentrations and flow rates in the stages do differ, enabling selective extraction. As previously described, a solution of diisobutyl dithiophosphene in kerosene extracts cadmium in extractor 20 when the volumetric flow ratio of the organic stream 22 to the aqueous stream 19 is from about 1/5 to about 1/200. In extractor 20a, a 0.5 molar solution of diisobutyl dithiophosphene in kerosene coextracts molybdenum and zinc when the organic stream 22a-to-aqueous stream 25 volumetric flow ratio is from about ½ to about 1/5.

Following this extraction, the raffinate depleted of cadmium, molybdenum and zinc passes to extractor 20b, where nickel is lastly extracted with the same 0.5 molar concentration extractant and an organic stream 22b-to-aqueous stream 25a flow ratio of ½ or greater. A three-minute mixing retention or contact time in extractor 20a is adequate to extract above about 90% of the molybdenum and zinc, and a three-minute mixing retention or contact time in extractor 20b is sufficient to extract about 90% of the nickel. Other aspects of the molybdenum-zinc and nickel recovery stages are similar to those described previously in relation to FIG. 2 for the cadmium recovery stage, but minor variation may be made to optimize these latter stages.

There does not appear to be a distribution ratio effect in the presently described extraction process, unlike ordinary solvent extraction processes. That is, a particular ratio of metal species between the organic and aqueous phases does not limit the extent of extraction from the aqueous carrier solution. Accordingly, multiple extraction stages for each extracted metal specie are not required except for process equipment design reasons. Also, significantly, metal value may be extracted from carrier solutions having very low concentrations of the metal species.

The following examples will serve to illustrate metallic extraction by the presently preferred embodiment of the invention, as applied to the concentration of metal values in wet process phosphoric acid:

EXAMPLE 1

A 250 ml sample of 28% $P_2O_5$ wet process phosphoric acid containing 36.4 parts per million (ppm) cadmium, 929 ppm zinc, 15.4 ppm molybdenum and 60 ppm nickel was contacted to a solution of 0.065 grams di-isobutyl dithiophosphinate in 100 ml kerosene carrier at room temperature (the diisobutyl dithiophosphinate was purchased from American Cyanamid Company as its Aerophine 3418A). After contact for about three minutes, the organic and aqueous phases were allowed to separate. A sample of the aqueous acid phase was analyzed, and found to have 1.6 ppm cadmium, 915 ppm zinc, 15.4 ppm molybdenum and 54.4 ppm nickel. Although minor amounts of zinc and nickel were extracted, the major portion of the cadmium was preferentially extracted.

EXAMPLE 2

Additional metal species were extracted from the cadmium-depleted acid of Example 1 by adding additional amounts of di-isobutyl dithiophosphinate to the kerosene, and contacting, separating and analyzing the acid as in Example 1. The following Table 1 summarizes the results, including the results of Example 1:

TABLE 1

| Extractant Addition | | Acid Analysis | | | |
|---|---|---|---|---|---|
| Incremental g. added | Cumulative g. added | Cadmium (ppm) | Zinc (ppm) | Molybdenum (ppm) | Nickel (ppm) |
| 0 | 0 | 36.4 | 929 | 15.4 | 60 |
| .065 | .065 | 1.6 | 915 | 15.4 | 54.4 |
| 2.435 | 2.5 | 0.2 | 613 | 4.6 | 43.1 |
| 1.3 | 3.8 | 0.2 | 260 | 3.6 | 36.5 |
| 1.3 | 5.1 | 0.2 | 84 | 3.2 | 27.3 |

The 2.435 and first 1.3 gram additions resulted in preferential extraction of molybdenum and zinc, removing additional cadmium and leaving the majority of the original nickel content. The second 1.3 gram addition extracted additional zinc and molybdenum, and reduced the nickel content to less than half of its original level. Although extraction as between zinc-molybdenum and nickel is not perfectly selective in this Example 2, those skilled in the art will recognize that such imperfect selectivity can still serve as the basis for continuous selective extraction of high efficiency as described above.

EXAMPLE 3

A fresh batch of 250 ml of the phosphoric acid described above in Example 1 was contacted with a solution of 27.3 g di-isobutyl dithiophosphinate in 100 ml kerosene in the manner described in Example 1. After separation, the acid was found to contain 38.9 ppm zinc, 1.6 ppm molybdenum, and 14.0 ppm nickel (no cadmium analysis was performed).

EXAMPLE 4

A fresh batch of 250 ml of the phosphoric acid described above in Example 1 was contacted with a solution of 68.8 g di-isobutyl dithiophosphinate in 100 ml kerosene in the manner described in Example 1. After separation, the acid was found to contain 36 ppm zinc, 0.0 ppm molybdenum, and 0.9 ppm nickel (no cadmium analysis was performed).

Examples 3 and 4 demonstrate that successively higher extractant concentrations extract additional nickel contents and relatively minor additional amounts of zinc and molybdenum.

EXAMPLE 5

To demonstrate the stripping stages 26 and 28 of FIG. 2, a 10 ml sample of kerosene containing in suspension Aerophine 3418A chelated with 1.46 grams per liter cadmium (corresponding to the cadmium loaded extractant stream 24 of FIG. 2) was contacted with successive quantities of strip solution containing 0.2M ammonium sulfate and 20% ammonium hydroxide. After each contact the strip solution was analyzed and the percent of original cadmium remaining in the kerosene was calculated. The results are presented in Table 2:

TABLE 2

| ml of Strip Solution | | % Cadmium extracted from kerosene |
|---|---|---|
| Incremental Addition | Cumulative Addition | |
| 5.0 | 5.0 | 4.0 |
| 10.0 | 15.0 | 15.0 |
| 15.0 | 30.0 | 85.0 |
| 10.0 | 40.0 | 90.0 |
| 10.0 | 50.0 | 99.0 |

At the end of the stripping process no Aerophine could be detected in the kerosene solvent, and the kerosene was essentially devoid of cadmium. This kerosene corresponds to that of the organic solvent 44 in FIG. 2, and could be recycled for additional extractions.

Although a particular embodiment of the invention is described in detail for purposes of illustration, various embodiments may be made without departing from the spirit and scope of the invention. Accordingly, the invention is not to be limited except as by the appended claims.

I claim:

1. A process for selectively recovering the metal values of a metal from a carrier solution, comprising the steps of:
   providing a carrier solution having metal values dissolved therein;
   contacting the carrier solution with a thio-organophosphene extractant to extract the metal values as a solid precipitate; and
   separating the precipitated metal values from the carrier solution.

2. The process of claim 1, wherein the carrier solution is phosphoric acid.

3. The process of claim 1, wherein the extractant is dissolved in a water-immiscible organic solvent.

4. The process of claim 3, wherein the metal specie extracted by the extractant is determined by the concentration of the extractant in the solvent and the relative flow rates of the carrier solution and the solution of extractant in organic solvent.

5. The process of claim 1, wherein the metal specie extracted is selected from the group consisting of cadmium, molybdenum and zinc, and nickel.

6. The process of claim 1, wherein the extractant is a thio-organophosphene selected from the group consisting of diisobutyldithiophosphene sulfide, tri-n-propylphosphene sulfide, tri-n-octylphosphene sulfide, dicyclohexyl phosphene sulfide, di i-butylphosphene sulfide, dicylohexyldithio-phosphinate and diisobutyl dithiophosphinate.

7. The process of claim 3, wherein the organic solvent is selected from the solvent group consisting of kerosene, decane, dodecane, toluene, p-xylene, and ethylbenzene.

8. The process of claim 1, wherein said carrier solution is neutral or basic with a pH less than about 10.

9. A continuous flow process for successively recovering in stages the metal values of a first metal and a second metal from a carrier stream, comprising the steps of:
providing a carrier stream containing at least two different metals dissolved therein;
providing a thio-organophosphene extractant capable of extracting metal value from a carrier solution as a metal precipitate;
extracting the first metal from the carrier stream using a first extractant stream having a flow rate adjusted to a first level to extract the first metal as a first metal precipitate, leaving a first depleted carrier stream; and
extracting the second metal from the first depleted carrier stream using a second extractant stream having a flow rate adjusted to a second level to extract the second metal as a second metal precipitate.

10. An ion flotation process for selectively concentrating a metallic specie from an aqueous carrier solution, comprising the steps of:
providing an aqueous carrier solution having a metal value dissolved therein;
contacting the carrier solution to a thio-organophosphene extractant dissolved in a water-immiscible organic solvent to precipitate the metal specie as a solid suspension in the organic solvent phase;
separating the organic solvent with the extractant and the suspended metal value contained therein from the depleted carrier solution raffinate;
stripping the extractant and suspended metal value from the organic solvent to form a loaded strip stream; and
concentrating the metal value from the loaded strip stream, to form a concentrated metallic solution and a depleted strip solution.

11. The process of claim 10, including an additional step of:
recovering the extractant from the depleted strip solution for recycling to said contacting step; after said concentrating step.

12. The process of claim 10, wherein the carrier solution is phosphoric acid.

13. The process of claim 10, wherein said stripping step is performed with an aqueous solution of a base selected from the group consisting of ammonium hydroxide, sodium hydroxide and potassium hydroxide.

14. The process of claim 10, wherein said concentrating step is by ion exchange.

15. The process of claim 11, wherein said recovering step includes the steps of:
adding to the depleted strip solution a mineral acid to form an acidic aqueous solution;
contacting the acidic aqueous solution to the organic solvent to transfer the extractant to the organic phase; and
separating the acidic aqueous solution from the organic phase.

16. An ion flotation process for selectively extracting metal values from a carrier solution, comprising the steps of:
providing an aqueous carrier solution having metal values dissolved therein;
precipitating a metal value from the carrier solution with a thio-organophosphene extractant;
scrubbing the carrier solution having the precipitated metal value therein with a water immiscible organic liquid to separate the precipitated metal value from the aqueous carrier solution as a solid; and
separating the metal value from the extractant and from the organic liquid.

17. The process of claim 16, wherein the selective extractant is initially dissolved in the organic liquid, so that said precipitating step and said scrubbing step are performed in a single operation.

18. An ion flotation process for selectively concentrating cadmium from wet process phosphoric acid, comprising the steps of:
providing wet process phosphoric acid having cadmium values dissolved therein;
contacting the phosphoric acid to a solution of a thio-organophosphene extractant dissolved in an organic solvent to precipitate the cadmium values as a suspension in the organic phase, thereby forming a cadmium-loaded organic phase;
stripping the cadmium values and the extractant from the cadmium-loaded organic phase with an aqueous solution of ammonium hydroxide and ammonium sulfate to form a cadmium-loaded aqueous strip stream;
passing the cadmium-loaded aqueous strip stream through an ion exchange column to transfer the cadmium values to an ion exchange resin; and
eluting the cadmium values from the ion exchange resin with a mineral acid.

19. The process of claim 18, including an additional step of:
recovering the extractant from the cadmium-depleted aqueous strip stream flowing from the ion exchange column by adding a mineral acid and contacting the resulting acidic aqueous solution to the organic solvent to transfer the extractant into the organic solvent;
after said passing step.

20. The process of claim 13, wherein said stripping step is performed with a basic solution also containing a dissolved anion to solubilize the metal ion being stripped.

21. The process of claim 20 wherein the dissolved anion is supplied by a salt from the group consisting of: sodium sulfate, potassium sulfate, ammonium sulfate, sodium chloride, potassium chloride, ammonium chloride, sodium nitrate, potassium nitrate, ammonium nitrate, calcium chloride and calcium nitrate.

22. A batch process for successively recovering in stages the metal values of a first metal and second metal from a carrier solution, comprising the steps of:
providing a carrier solution containing at least two different metals dissolved therein;
providing a thio-organophosphene extractant capable of extracting metal value from a carrier solution as a metal precipitate;
adding a first amount of the extractant to the carrier solution, the concentration of extractant in the carrier solution being sufficient to extract the first metal, thereby forming a first metal precipitate and a first depleted carrier solution;

separating the first metal precipitate from the first depleted carrier solution;

adding a second amount of the extractant to the first depleted carrier solution, the concentration of extractant in the first depleted carrier solution being sufficient to extract the second metal, thereby forming a second metal precipitate and a second depleted carrier solution; and separating the second metal precipitate from the second depleted carrier solution.

* * * * *